(12) United States Patent
Henry et al.

(10) Patent No.: US 7,175,678 B2
(45) Date of Patent: Feb. 13, 2007

(54) FUEL COMPOSITION

(75) Inventors: Cyrus Pershing Henry, Wilmington, DE (US); David Leonard Pinch, Wirral (GB); Andrea Sneddon, Wirral (GB); Derek Richard Green, Preston (GB)

(73) Assignee: Innospec Limited (GB)

( * ) Notice: Subject to any disclaimer, the term of this patent is extended or adjusted under 35 U.S.C. 154(b) by 264 days.

(21) Appl. No.: 10/672,678

(22) Filed: Sep. 26, 2003

(65) Prior Publication Data

US 2004/0231235 A1 Nov. 25, 2004

(30) Foreign Application Priority Data

Jan. 13, 2003 (GB) .................. 0300714.3

(51) Int. Cl.
*C10L 1/236* (2006.01)

(52) U.S. Cl. .................. 44/333; 44/334; 44/335; 44/336; 44/338; 44/339; 44/340; 44/341; 44/342; 44/343; 44/344; 44/346; 44/347; 44/348; 44/349; 44/350; 44/351; 44/352; 44/353

(58) Field of Classification Search .................. None
See application file for complete search history.

(56) References Cited

U.S. PATENT DOCUMENTS

| | | | |
|---|---|---|---|
| 3,371,040 A * | 2/1968 | Emmons | 508/243 |
| 3,864,099 A | 2/1975 | Ek | |
| 4,094,799 A | 6/1978 | DeVries et al. | |
| 4,954,135 A | 9/1990 | Le | |
| 5,006,621 A | 4/1991 | Wahle et al. | |
| 5,458,660 A | 10/1995 | Lin et al. | |
| 5,507,843 A | 4/1996 | Lin et al. | |
| 5,752,990 A | 5/1998 | Siskin et al. | |
| 6,750,305 B2 * | 6/2004 | Gateau et al. | 526/264 |

FOREIGN PATENT DOCUMENTS

| | | |
|---|---|---|
| EP | 0 199 453 A2 | 10/1986 |
| EP | 0 382 493 A1 | 8/1990 |
| EP | 0 750 031 A2 | 12/1996 |
| EP | 0 750 031 A3 | 12/1996 |
| GB | 1124311 | 8/1968 |
| JP | 09-179073 | 7/1997 |
| WO | WO 99/58580 | 11/1991 |
| WO | WO 96/38492 | 12/1996 |
| WO | WO 99/57162 | 11/1999 |
| WO | WO 01/18080 A1 | 3/2001 |
| WO | WO 02/098926 A2 | 12/2002 |

* cited by examiner

*Primary Examiner*—Matthew A. Thexton
(74) *Attorney, Agent, or Firm*—Fay, Sharpe, Fagan, Minnich & McKee, LLP

(57) ABSTRACT

The present invention provides a polymeric a fuel composition comprising (i) a fuel; and (ii) a polymeric compound; wherein the polymeric compound comprises at least one monomer unit of Formula I

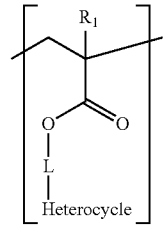

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring.

46 Claims, 2 Drawing Sheets

FUEL COMPOSITION

The present invention relates to a compound. In particular, the present Invention relates to a polymeric compound that is useful as a fuel additive.

Hydrocarbon fuels, such as fuels boiling in the gasoline boiling range, kerosene, middle distillate fuels, home heating oils etc. are known to exhibit certain undesirable characteristics such as the formation of solid deposits. These undesirable characteristics may develop more readily during prolonged periods of storage or when the hydrocarbon fuel remains at a high temperature over a period of time, for example during use.

As discussed in U.S. Pat. No. 5,621,154, turbine combustion fuel oils i.e. jet fuels, such as JP-4, JP-5, JP-7, JP-8, Jet A, Jet A-1 and Jet B are ordinarily middle boiling distillates, such as kerosene or combinations of naphtha and kerosene. Military grade JP-4, for instance, is used in military aircraft and is a possible blend of naphtha and kerosene. Military grades JP-7 and JP-8 are primarily highly refined kerosenes, as are Jet A and Jet A-1, which are used for commercial aircraft. Civil grades of jet fuel are defined in ASTM D1655, DefStan 91–91, and other similar specifications. Such jet fuel are produced from a variety of sources including crude oil, oil sands, oil shales, Fischer Tropsch processes and gas to liquid processes. Refinery processing includes fuels produced by straight distillation, sometimes processed by chemical sweetening, or hydrogen processing including hydrocracking operations, and may contain <1 to 3000 ppm sulphur.

As discussed in WO 99/25793, in high speed aircraft, both civilian and military, liquid fuel is combusted to produce power, but is also circulated in the aircraft as a heat exchange fluid to remove the excess heat generated at such speeds e.g. in lubricating oils. In current aircraft, bulk fuel temperatures may be raised to as high as 425° F. at the inlet to the mainburner fuel nozzles and above 500° F. Inside the fuel nozzle passages. In the augmentor or afterburner systems, skin temperatures up to 1100° F. are experienced. In future aircraft, these temperatures are expected to be 100° F. higher. The fuel is thus maintained for long periods at high temperatures.

At these high temperatures (425° F.–1100° F.) and oxygen-rich atmospheres in aircraft and engine fuel system components, the fuel discolours and decomposes to produce soluble coloured products and insoluble products such as gums, sediments and granular material. These insoluble products can form deposits that reduce the heat exchange capacity and plug-up the components leading to operational problems including reduced thrust and performance anomalies in the augmentor, poor spray patterns and premature failure of mainburner combustors and problems with fuel controls. Further, the engine exhaust becomes smoky and sooty and engine noise increases, both of which are undesirable characteristics for jet engines.

The problems of deposition from fuels at elevated temperatures is not limited to the use of fuels in the extreme environments encountered in aviation. In some oil fired devices, such as boilers and slow heating cookers, e.g. of the Aga type, kerosene oil fuel is passed down a narrow metal feed pipe to the combustion chamber where it is burnt. Parts of the pipe are sufficiently near the hot chamber for them to be heated to significant temperatures, resulting in the risk of thermal degradation of the fuel in the pipe, especially with slow feed rates and high residence times in the pipe. This degradation can form solid deposits, which reduce the flow and ultimately stop it, causing the combustion to stop. To overcome this, manufacturers of such devices have, for many years, recommended to their users that at least once each 6 months such pipe parts are cleaned of solid deposits of coke or other materials.

Detergent additives for inhibiting the oxidation of fuels and the inhibition of deposit formation have been proposed.

WO-A-01/68731 discloses N-vinylpyrrolidone and alkyl acrylate and/or methacrylate copolymers comprising 10 to 50 carbon atoms with particular distributions of chains for use as additives for inhibiting paraffin deposit and for improving flow properties of crude oils.

EP-A-0199453 discloses polymers having useful properties as oil additives which are obtained by incorporating additional functional monomer units into oil soluble backbone polymers having linear carbon chains especially ethylene-propylene copolymers and ethylene-propylenediene terpolymers. Certain polymers of the invention are useful dispersant additives for fuel oils.

U.S. Pat. No. 5,458,660 discloses cyclic amide compounds containing multiple polyether alcohol backbones which are useful as additives for fuel compositions having a major amount of a mixture of hydrocarbons in the gasoline boiling range. The invention is directed to the use of these compounds for decreasing intake valve deposits, controlling octane requirement increases and reducing octane requirement.

U.S. Pat. No. 5,507,843 discloses multiple cyclic nitrogen containing alkoxylate compounds useful as additives in fuel compositions. The invention is directed to the use of these compounds for decreasing intake valve deposits, controlling octane requirement increases and reducing octane requirement.

U.S. Pat. No. 5,752,990 discloses an unleaded fuel to which has been added an additive selected from the group consisting of low boiling alkyl pyridines, 4-vinylpyridine, DMF, N-formylpiperidine, sulfolane, polyolefin, polyether or polyether amine derivatives of DMF, amidene or N-substituted-2-pyrrolidones, polyolefin. A reduction in combustion chamber deposits and intake valve deposits in a spark ignition combustion engine which uses such fuel is disclosed.

Each fuel additive has particular properties and interacts with the fuel and with other fuel additives in a characteristic manner. Thus a given fuel additive may be particularly beneficial in certain types of fuel or under certain conditions. There exists an ongoing need for novel fuel additives, in particular deposit inhibiting compounds, from which one skilled in the art may select a fuel additive having properties suitable for a particular application.

The present invention alleviates the problems of the prior art.

In one aspect the present invention provides a fuel composition compound (i) a fuel; and (ii) a polymeric compound; wherein the polymeric compound comprising at least one monomer unit of Formula I

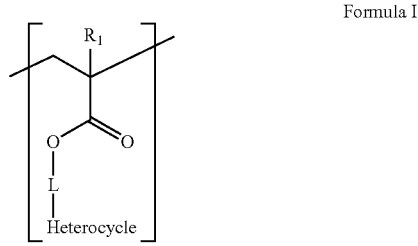

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring.

In another aspect the present invention provides a fuel composition comprising (i) a fuel; and (ii) a polymeric compound; wherein the polymeric compound is obatined or obtainable by, preferably obtained by, a process comprising the steps of:

(i) polymerising monomer A

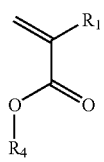

Monomer A wherein $R_1$ is H or a $C_{1-10}$ hydrocarbyl group; and wherein $R_4$ is a $C_{2-10}$ unsaturated hydrocarbyl group; and (ii) reacting the product of step (i) with compound C $R_5$—Heterocycle   Compound C wherein $R_5$ is a $C_{2-10}$ unsaturated hydrocarbyl group; and wherein heterocycle is an optionally substituted heterocyclic ring.

In one aspect, the present invention provides a fuel additive composition comprising (i) a polymeric compound as herein defined and (ii) a metal deactivator and/or an antioxidant.

In a further aspect the present invention provides a fuel composition comprising (i) a fuel; and (ii) a fuel additive composition as herein defined.

In a further aspect the present invention provides use of a polymeric compound as herein defined or a fuel additive composition as herein defined for (i) the inhibition of oxidation of a fuel composition as herein defined; and/or (ii) the inhibition of deposit formation in a fuel composition as herein defined; and/or (iii) the inhibition of particle formation from the oxidation product(s) of a fuel composition as herein defined: and/or (iv) the solubilisation of deposits and/or deposit precursors in a fuel composition as herein defined.

In a further aspect the present invention provides a method for inhibiting deposit formation in a fuel at a temperature of from 100 to 335° C., the method comprising combining with the fuel a polymeric compound comprising at least one monomer unit of Formula I

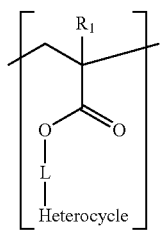

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring; or a fuel additive composition as herein defined.

We have surprisingly found that polymeric compounds of the present invention may advantageously be used as deposit-inhibiting compounds. In particular, addition of a polymeric compound of the present invention to a fuel may improve the properties of the fuel and in particular may inhibit or prevent precombustion oxidation of the fuel and deposit and/or particle formation. Furthermore, the polymeric compound of the present invention may increase the solubilisation of deposits in a fuel to which it is added. The improvement in the properties of a fuel to which a polymeric compound of the present invention has been added, may for example be studied using the Isothermal Corrosion Oxidation Test (ICOT) or the Hot Liquid Process Simulator (HLPS).

As used herein, the term "hydrocarbyl" refers to a group comprising at least C and H that may optionally comprise one or more other suitable substituents. Examples of such substituents may include halo-, alkoxy-, nitro-, an alkyl group, or a cyclic group. In addition to the possibility of the substituents being a cyclic group, a combination of substituents may form a cyclic group. If the hydrocarbyl group comprises more than one C then those carbons need not necessarily be linked to each other. For example, at least two of the carbons may be linked via a suitable element or group. Thus, the hydrocarbyl group may contain heteroatoms. Suitable heteroatoms will be apparent to those skilled in the art and include, for instance, sulphur, nitrogen, oxygen, silicon and phosphorus.

The term "heterocyclic ring" as herein defined means a cyclic moiety comprising at least one carbon atom and at least one heteroatom in the ring. Suitable heteroatoms will be apparent to those skilled in the art and include, for instance, sulphur, nitrogen, oxygen, silicon and phosphorus.

The heterocyclic ring may optionally be substituted with one or more suitable substituents. Examples of such substituents may include halo-, alkoxy-, nitro-, an alkyl group, or a cyclic group. In addition to the possibility of the substituents being a cyclic group, a combination of substituents may form a cyclic group.

Any substituent is preferably inert under the reaction conditions employed in the preparation of the polymeric compound and preferably should not give unfavourable interactions with the fuel or other additives employed in the fuel composition. Substituents meeting these conditions will be readily apparent to a person skilled in the art.

The term "fuel" as used herein relates to liquid hydrocarbon fuel.

Liquid hydrocarbon fuels are known to be subject to deterioration when in contact with oxygen, either on standing in air or during pre-combustion heating. Such deterioration is thought to be due to the presence in the fuel of constituents that undergo oxidative changes resulting in the formation of non-volatile resinous substances. In addition, the high temperatures and oxygen-rich atmospheres typically encountered during use encourage the degradation of the fuel resulting in particulate formation. The resinous substances and particulates may typically be insoluble and may therefore be deposit precursors. These deposit precursors may unfavourably agglomerate and/or form deposits. Additionally, the particulates may collect in filters leading to partial or total blockage of such filters.

The term "inhibition of oxidation of a fuel composition" as used herein means reducing the rate of one or more oxidative reactions and/or preventing one or more oxidative reactions as compared to a fuel not containing a polymeric compound of the present invention. It will be readily understood that by the term oxidation is meant pre-combustion oxidation.

The term "inhibition of deposit formation in a fuel composition" as used herein means a reduction of the mass of deposit formed under prescribed conditions over a prescribed period of time as compared to a fuel not containing a polymeric compound of the present invention.

The term "inhibition of particulate formation from the oxidation product(s) of a fuel composition" as used herein means a reduction in particulate formation formed under prescribed conditions over a prescribed period of time as compared to a fuel not containing a polymeric compound of the present invention.

The term "solubilisation of deposits and/or deposit precursors in a fuel composition" as used herein means increasing the solubility of deposits and/or deposit precursors under prescribed conditions as compared to a fuel not containing a compound of Formula I.

For ease of reference these and further aspects of the present invention are now discussed under appropriate section headings. However, the teachings under each section are not necessarily limited to each particular section.

PREFERRED ASPECTS

Polymeric Compound

Figure 1:
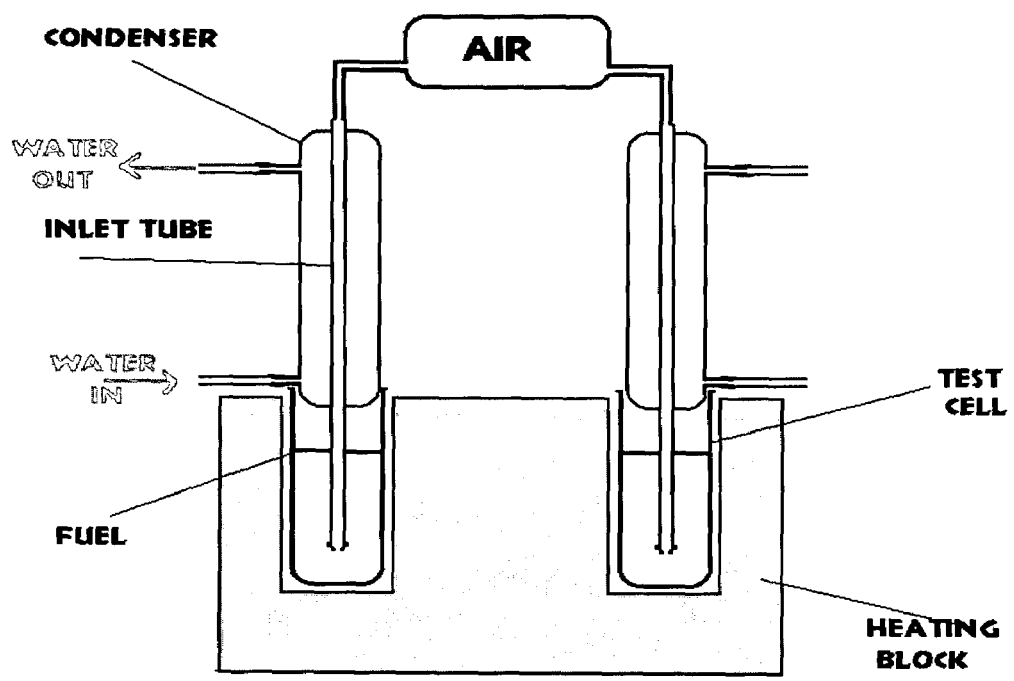
FIG. 1 shows the Isothermal Corrosion Oxadation Test (ICOT) apparatus.

As previously mentioned, in one aspect, the present invention provides a fuel composition comprising (i) a fuel; and (ii) a polymeric compound; wherein the polymeric compound comprising at least one monomer unit of Formula I

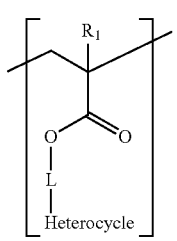

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring.

In one aspect, the polymeric compound further comprises at least one monomer unit of Formula II

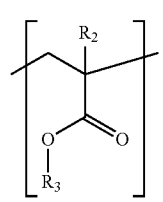

Formula II wherein $R_2$ is H or a $C_{1-10}$ hydrocarbyl group; and wherein $R_3$ is a $C_{1-30}$ hydrocarbyl group.

In one aspect, the polymeric compound further comprises at least one monomer unit of formula III

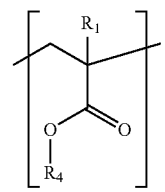

Formula III wherein $R_1$ is H or a $C_{1-10}$ hydrocarbyl group; and wherein $R_4$ is a $C_{2-10}$ unsaturated hydrocarbyl group.

In one preferred aspect the polymeric compound comprises at least one monomer unit Formula I

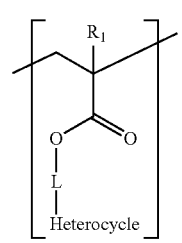

Formula I wherein $R_1$ is H or a $C_{1-10}$ hydrocarbyl group; and wherein L is an is an optional $C_{1-30}$ hydrocarbyl linker group; and wherein heterocycle is an optionally substituted heterocyclic ring; and at least one monomer unit of Formula II

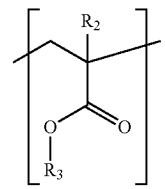

Formula II wherein $R_2$ is H or a $C_{1-10}$ hydrocarbyl group; and wherein $R_3$ is a $C_{1-30}$ hydrocarbyl group.

In one preferred aspect the polymeric compound comprises at least one monomer unit of Formula I

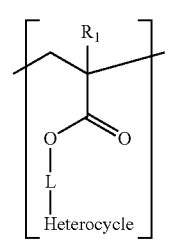

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring; and at least one monomer unit of Formula III

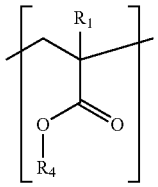

Formula III wherein $R_1$ is H or a $C_{1-10}$ hydrocarbyl group; and wherein $R_4$ is a $C_{2-10}$ unsaturated hydrocarbyl group.

In one highly preferred aspect the polymeric compound comprises at least one monomer unit of Formula I

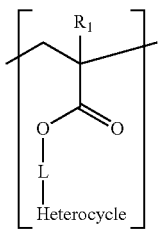

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring; and at least one monomer unit of Formula II

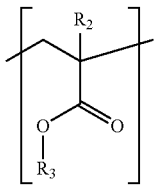

Formula II wherein $R_2$ is H or a $C_{1-10}$ hydrocarbyl group; and wherein $R_3$ is a $C_{1-30}$ hydrocarbyl group; and at least one monomer unit of Formula III

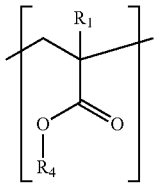

Formula III wherein $R_1$ is H or a $C_{1-10}$ hydrocarbyl group; and wherein $R_4$ is a $C_{2-10}$ unsaturated hydrocarbyl group.

Heterocyclic Ring of Formula I

In one aspect the heterocyclic ring of Formula I comprises at least one nitrogen. Preferably, the heterocyclic ring comprises at least one tertiary nitrogen. Preferably the at least one nitrogen of the heterocyclic ring has a bond to an atom of the linker group L or to the C(O)O group of Formula I.

In one preferred aspect, the heterocyclic ring is other than a pyridine.

Preferably the heterocyclic ring comprises at least one amide functional group.

Preferably, the heterocyclic ring is of Formula IV

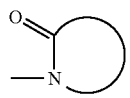

Formula IV

It will be readily appreciated that the heterocyclic ring of Formula IV may comprise any number of atoms in the ring provides it comprises at least three atoms in the ring. In addition to the nitrogen shown, the heterocyclic ring of Formula IV may comprise other heteroatoms in the ring. Additionally, the heterocyclic ring of Formula IV may optionally be substituted with one or more substituents.

Preferably, the heterocyclic ring of Formula IV comprises no heteroatoms other than the nitrogen and oxygen shown.

Preferably the one or more optional substituents are selected from alkyl substituents. More preferably the heterocyclic ring of Formula IV is unsubstituted.

In one aspect the heterocyclic ring is a 4 to 10 membered ring such as a 4, 5 or 6 membered ring.

In one aspect, the heterocyclic ring is of Formula V

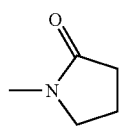

Formula V

Linker Group

As previously mentioned, L in Formula I is an optional $C_{1-30}$ hydrocarbyl linker group.

In one aspect L is present.

In one aspect, L is a $C_{1-20}$ hydrocarbyl linker group, preferably a $C_{1-15}$ hydrocarbyl linker group, preferably a $C_{1-10}$ hydrocarbyl linker group such as a $C_{4-10}$ hydrocarbyl linker group.

Preferably, L is a linker group comprising at least four carbon atoms.

Preferably, L is a hydrocarbon linker group.

The term "hydrocarbon" as used herein means a group containing only carbon and hydrogen such as any one of an alkyl group, an alkenyl group, an alkynyl group, an acyl group, which groups may be linear, branched or cyclic, or an aryl group. The term hydrocarbon also includes those groups but wherein they have been optionally substituted. If the hydrocarbon is a branched structure having substituent(s) thereon, then the substitution may be on either the hydrocarbon backbone or on the branch; alternatively the substitutions may be on the hydrocarbon backbone and on the branch.

In a preferred aspect, L is a straight chained or branched hydrocarbon linker group having the formula $(C_xH_{2x})$ wherein x is an integer. In one aspect x is an integer from 1 to 30, preferably 1 to 20 more preferably 0.1 to 10.

In a preferred aspect L is $(CH_2)_y$, wherein y is an integer. In one aspect y is an integer from 1 to 30, preferably 1 to 20 more preferably 1 to 10.

In a highly preferred aspect L is $(CH_2)_4$.

$R_1$, $R_2$, $R_3$ and $R_4$

As previously mentioned $R_1$ in Formula I is H or a $C_{1-10}$ hydrocarbyl group.

Preferably, $R_1$ is H or a $C_{1-5}$ hydrocarbyl group such as a $C_{1-3}$ hydrocarbyl group.

Preferably $R_1$ is H or a hydrocarbon group. More preferably $R_1$ is H or an alkyl group. Preferably $R_1$ is selected from H, methyl, ethyl, propyl, butyl or pentyl. More preferably $R_1$ is H or methyl.

As previously mentioned, $R_2$ of Formula II is H or a $C_{1-10}$ hydrocarbyl group.

Preferably $R_2$ is H or a $C_{1-5}$ hydrocarbyl group such as a $C_{1-3}$ hydrocarbyl group.

Preferably $R_2$ is H or a hydrocarbon group. More preferably $R_2$ is H or an alkyl group. Preferably $R_2$ is selected from H, methyl, ethyl, propyl, butyl or pentyl. More preferably $R_2$ is H or methyl.

As previously mentioned $R_3$ in Formula II is a $C_{1-30}$ hydrocarbyl group.

Preferably $R_3$ is a $C_{1-25}$ hydrocarbyl group, such as a $C_{1-20}$ group or a $C_{1-15}$ group or a $C_{1-10}$ group.

Preferably $R_3$ is a $C_{5-25}$ hydrocarbyl group such as a $C_{5-20}$ group for example a $C_7$ group, a $C_{12}$ group or a $C_{18}$ group.

Preferably $R_3$ is a hydrocarbon group.

In one preferred aspect $R_3$ is an alkyl group, preferably a linear alkyl group, preferably a $C_{10-20}$ linear alkyl group such as a lauryl group or a stearyl group.

In another preferred aspect $R_3$ is or comprises an aromatic group. Preferably $R_3$ is or comprises a six membered aromatic ring. Preferably $R_3$ is a benzyl group.

As previously mentioned $R_4$ in Formula III is a $C_{2-10}$ unsaturated hydrocarbyl group. Preferably $R_4$ is a $C_{2-8}$ unsaturated hydrocarbyl group, more preferably a $C_{2-5}$ unsaturated hydrocarbyl group.

Preferably $R_4$ is an unsaturated hydrocarbon group.

Preferably $R_4$ comprises a terminal carbon-carbon multiple bond such as a carbon-carbon double bond.

In a highly preferred aspect $R_4$ is an ethenyl group.

Polymeric Compound

In one aspect preferably the monomer units of Formula I and/or monomer units of Formula II and/or monomer units of Formula III comprise at least 70% by weight of the polymeric compound, preferably at least 80% by weight; more preferably at least 90% by weight, more preferably at least 95% by weight.

In one aspect preferably the monomer units of Formula I comprise 1 to 60% by weight of the polymeric compound, preferably 1 to 40% by weight, more preferably 1 to 30% by weight, more preferably 1 to 15% by weight.

In one aspect preferably the monomer units of Formula II comprise at least 30% by weight of the polymeric compound, preferably at least 40% by weight, more preferably at least 50% by weight, more preferably at least 60% by weight, more preferably at least 80% by weight, more preferably at least 90% by weight.

In one aspect preferably the monomer units of Formula III comprise less than 10% by weight of the polymeric compound, preferably less than 5% by weight, more preferably less than 2% by weight.

In one aspect the molecular weight ($M_n$) of the polymeric compound is from 20,000 to 90,000 such as from 20,000 to 50,000 or from 50,000 to 90,000.

Fuel Composition

As previously mentioned, in one aspect the present invention provides a fuel composition comprising (i) a fuel; and (ii) a polymeric compound; wherein the polymeric compound is obtained or obtainable by, preferably obtained by, a process comprising the steps of a process for producing a polymeric compound comprising the steps of (i) polymerising monomer A

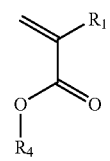

Monomer A wherein $R_1$ and $R_4$ are as herein defined; and (ii) reacting the product of step (i) with compound C $R_5$—Heterocycle Compound C wherein $R_5$ is a $C_{2-10}$ unsaturated hydrocarbyl group; and wherein heterocycle is an optionally substituted heterocyclic ring.

In a preferred aspect, in step (i), monomer A is copolymerised with monomer B

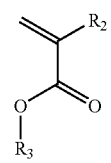

Monomer B wherein $R_2$ and $R_3$ are as herein defined.

$R_5$

As previously mentioned, $R_5$ is a $C_{2-10}$ unsaturated hydrocarbyl group. Preferably $R_5$ is a $C_{2-8}$ unsaturated hydrocarbyl group, more preferably a $C_{2-5}$ unsaturated hydrocarbyl group.

Preferably $R_5$ is an unsaturated hydrocarbon group.

Preferably $R_5$ comprises a terminal carbon-carbon multiple bond such as a carbon-carbon double bond.

In a highly preferred aspect $R_5$ is an ethenyl group.

Heterocyclic Ring of Compound C

As previously mentioned, the heterocycle of compound C is an optionally substituted heterocyclic ring.

In one aspect the heterocyclic ring of compound C comprises at least one nitrogen. Preferably, the heterocyclic ring comprises at least one tertiary nitrogen. Preferably the heterocyclic ring comprises at least one amide functional group.

Preferably compound C is of Formula VI

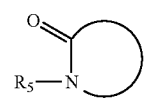

Formula VI wherein $R_5$ is as herein defined.

It will be readily appreciated that the heterocyclic ring of Formula VI may comprise any number of atoms in the ring provided it comprises at least three atoms in the ring. In addition to the nitrogen shown, the heterocyclic ring of Formula VI may comprise other heteroatoms in the ring. Additionally, the heterocyclic ring of Formula VI may optionally be substituted with one or more substituents.

Preferably, the heterocyclic ring of Formula VI comprises no heteroatoms other than the nitrogen and oxygen shown.

Preferably the one or more optional substituents are selected from alkyl substituents. More preferably the heterocyclic ring of Formula VI is unsubstituted.

In one aspect the heterocyclic ring of compound C is a 4 to 10 membered ring such as a 4, 5 or 6 membered ring, Preferably compound C is N-vinylpyrrolidone.

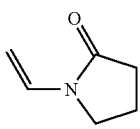

Fuel Additive Composition

In one aspect the present invention provides a fuel additive composition comprising (i) a polymeric compound as herein defined and (ii) a metal deactivator and/or an antioxidant.

In one aspect the present invention provides a fuel additive composition comprising (i) a polymeric compound as herein defined and (ii) a metal deactivator.

In another aspect the present invention provides a fuel additive composition comprising (i) a polymeric compound as herein defined and (ii) an antioxidant.

Preferably the fuel additive composition comprises (i) a polymeric compound as herein defined and (ii) a metal deactivator and an antioxidant.

An example of a suitable metal deactivator is N,N'-disalicylidene-1,2-propanediamine.

Examples of suitable antioxidants include 2,6-di-t-butyl-4-methyl phenol (BHT) and dilauryl phosphonate.

Fuel Composition

As previously mentioned, in one aspect the present invention provides a fuel composition comprising (i) a fuel and (ii) a fuel additive composition as herein defined.

Fuel

Preferably the fuel is a jet fuel.

Preferably the fuel is JP-8 aviation fuel.

Jet fuel typically comprises paraffins as a major component and may contain aromatics and naphthenes. The main component of the jet fuel is usually a middle boiling distillate having a boiling point in the range 150–300° C. at atmospheric pressure. The jet fuel may comprise mixtures of naphtha and light petroleum distillate, e.g. in weight amounts of 20–80:8–20 such as 50–75:50–25 which weight amounts may also be used for mixtures of naphtha and kerosene.

The jet fuels for military use are designated JP-4 to 8 e.g. JP-4 as 65% naphtha/35% light petroleum distillate (according to US Mil. Spec. (MIL 5624G)), JP-5, a kerosene fuel but of higher flash point, JP-7, a high flash point special kerosene for advanced supersonic aircraft and JP-8, a kerosene similar to Jet Al (according to MIL 83133C).

Jet fuel for civilian use is usually a kerosene type fuel and designated Jet A or Jet Al.

The jet fuel may have a boiling point of 66–343° C. or 66–316° C. (150–650° F. e.g. 150–600° F.), initial boiling point of 149–221° C., e.g. 204 C (300–430° F., e.g. 400°°F.), a 50% boiling point of 221–316° C. (430–600° F.) and a 90% boiling point of 260–343° C. (500–650° F.) and API Gravity of 30–40. Jet fuel for turbojet use may boil at 93–260° C. (200–500° F.) (ASTM D1656-006).

Further details on aviation fuels may be obtained from "Handbook of Aviation Fuel Properties"; Co-ordinating Research Council Inc., CRC Report No. 530 (Society of Automotive Engineers Inc., Warrendale, Pa., USA, 1983) and on US military fuels, from "Military Specification for Aviation Turbine Fuels", MIL-T-5624P.

The jet fuel may be the straight run kerosene optionally with added naphtha, but frequently has been purified to reduce its content of components contributing to or encouraging formation of coloured products and/or precipitates. Among such components are aromatics, olefins, mercaptans, phenols and various nitrogen compounds. Thus the jet fuel may be purified to reduce its mercaptan content e.g. Merox fuel and copper sweetened fuel or to reduce its sulphur content e.g. hydrogen treated fuel or Merifined fuel.

Merox fuels are made by oxidation of the mercaptans and have a low mercaptan S content (e.g. less than 0005% wt S) such as 0.0001–0.005% but a higher disulphide S content (e.g. at most 0.4% or at most 0.3% wt S such as 0.05–0.26 e.g. 0.1–2%); their aromatic (e.g. phenolics) and olefins content are hardly changed. Hydrogen processed jet fuels are ones in which the original fuel has been hydrogenated to remove at least some of sulphur compounds e.g. thiols and under severe conditions to saturate the aromatics and olefins; hydrofined jet fuels have very low sulphur contents (e.g. less than 0.01% S by weight). Merifined fuels are fuels that have been extracted with an organic extractant to reduce or remove their contents of sulphur compounds and/or phenols.

The jet fuel may also contain metals, either following contact with metal pipes or carried over from the crude oil, oil sands, shale oil or sources; examples of such metals are copper, nickel, iron and chromium usually in amounts of less than 1 ppm e.g. each in 0–150 ppb amounts.

Merox, straight run and hydrogen processed are preferred and may be used in JP-4-8 jet fuels.

The fuel composition of the present invention may contain at least one conventional additive for fuels such as an antioxidant, a corrosion inhibitor, a lubricity improver, a metal deactivator (MDA), a leak detection additive, a "special purpose" additive such as a drag reducing agent, an anti-icing additive and a static dissipater such as Stadis®, especially in amounts of 1–2000 ppm each.

In a preferred embodiment the fuel composition of the present invention is suitable for use as an aviation fuel. In particular, the fuel composition complies with at least one of:

ASTM D 1655 Specification for Aviation Turbine Fuels
Defence Stan 91—91 Turbine Fuel, Aviation Kerosene Type, Jet A-1
NATO code F-35, F-34, F-37
Aviation Fuel Quality Requirements for Jointly Operated Systems (Joint
Checklist) A combination of ASTM and Def Stan requirements
GOST 10227 Jet Fuel Specifications (Russia)
Canadian CAN/CGSB-3.22 Aviation Turbine Fuel, Wide Cut Type
Canadian CAN/CGSB-3.23 Aviation Turbine Fuel, Kerosene Type
MIL-DTL-83133, JP-8
MIL-DTL-5624, JP-4, JP-5
QAV-1 (Brazil) Especifcacao de Querosene de Aviacao No. 3 Jet Fuel (Chinese) according to GB6537

DCSEA 134A (France) Carbureacteur Pour Turbomachines D'Aviation, Type Kerosene

Aviation Turbine Fuels of other countries, meeting the general grade requirements for Jet A, Jet A-1, Jet B, and TS-1 fuels as described in the IATA Guidance Material for Aviation Turbine Fuel Specifications.

Preferably the polymeric compound is present in the fuel composition in an amount of 1 to 500 mg/L, preferably 5 to 150 mg/L, more preferably 5 to 50 mg/L, even more preferably 15 to 30 mg/L.

In one aspect the fuel composition comprises the fuel in a major amount and the polymeric compound in a minor amount.

Method

As previously mentioned, in one aspect the present invention provides a method for inhibiting deposit formation in a fuel at a temperature of from 100 to 335° C., the method comprising combining with the fuel a polymeric compound comprising at least one monomer unit of Formula I

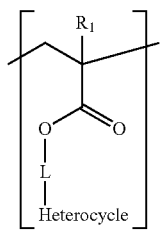

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring; or a fuel additive composition as herein defined.

Preferably, the polymeric compound is as herein defined.

In a further aspect the present invention provides a method for inhibiting deposit formation in a fuel at a temperature of form 110 to 335° C., the method comprising combining with the fuel a polymeric compound, wherein the polymeric compound is obtained or obtainable by, preferably obtained by, process comprising the steps of (i) polymerising monomer A

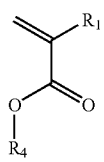

Monomer A wherein $R_1$ is H or a $C_{1-10}$ hydrocarbyl group; and wherein $R_4$ is a $C_{2-10}$ unsaturated hydrocarbyl group; and (ii) reacting the product of step (i) with compound C $R_5$—Heterocycle Compound C wherein $R_5$ is a $C_{2-10}$ unsaturated hydrocarbyl group; and wherein heterocycle is an optionally substituted heterocyclic ring; or a fuel additive composition as herein defined.

Broad Aspects

In a broad aspect the present invention provides a polymeric compound comprising at least one monomer unit of Formula I

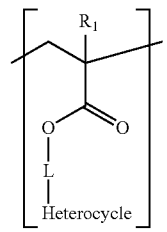

Formula I wherein $R_1$ is H or a $C_{1-10}$ hydrocarbyl group; wherein L is an optional $C_{1-30}$ hydrocarbyl linker group; and wherein heterocycle is an optionally substituted heterocyclic ring.

In another broad aspect the present invention provides a process for producing a polymeric compound comprising the steps of (i) polymerising monomer A

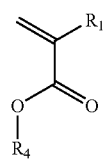

Monomer A wherein $R_1$ is H or a $C_{1-10}$ hydrocarbyl group; and wherein $R_4$ is a $C_{2-10}$ unsaturated hydrocarbyl group; and (ii) reacting the product of step (i) with compound C $R_5$—Heterocycle Compound C wherein $R_5$ is a $C_{2-10}$ unsaturated hydrocarbyl group; and wherein heterocycle is an optionally substituted heterocyclic ring.

Aspects of the invention are defined in the appended claims.

The present invention will now be described in further detail by way of example only with reference to the accompanying figures in which:

FIG. 1 shows the Isothermal Corrosion Oxidation Test (ICOT) apparatus; and

Figure 2:
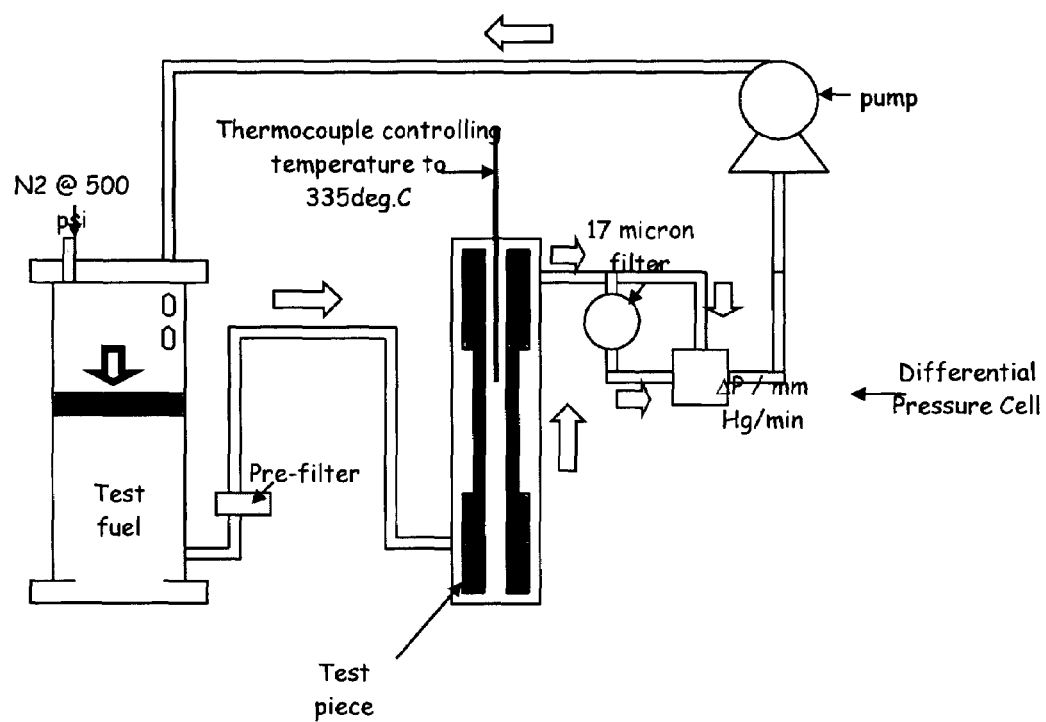
FIG. 2 shows the Hot Liquid Process Simulator (HLPS) apparatus.

FIG. 2 shows the Hot Liquid Process Simulator (HLPS) apparatus.

The present invention will now be described in further detail in the following examples.

EXAMPLES

Test Protocols

The polymeric compounds according to the present invention were tested as fuel additives using the ICOT and the HLPS. Protocols for these two tests are set out below.

Protocol I-ICOT

Scope—The ICOT is used to investigate the effectiveness of additives in jet fuel. This is carried out by stressing base and additised fuels at constant temperature with a controlled volume of air flowing though the sample. On cooling, the fuels are filtered and the thermal stability is measured by the weight of solid on a filter.

Summary—The ICOT is run under the following conditions, 100 ml of fuel is stressed at 180° C. with an air flow of 1.3 liters/hour for 5 hours. The fuel sample is then left to cool for 16 hours The cooled fuel is then filtered using a 0.7 to 1 µm glass microfibre filter. The weight of solid on the filter is a measurement of the fuels thermal stability under stress. By comparing base fuels to additised fuels, the effectiveness of different additives can be compared.

Apparatus—See ASTM Method D4871-88 for description of apparatus. The filter to be used is a 0.7 to 1 µm glass micro-fibre filter. For cleaning of glassware a furnace anneals the glass inlet tubes and the test cell at 600° C. Filtration is done under suction using an appropriate funnel Materials Base fuels—fuels not containing additives Additised fuels—base fuels that have been treated with a specified additive or additive package.

Preparation—Clean glassware must be used for each experiment. The cleaning of the glass inlet tubes and the test cells is done by annealing in a furnace at 600° C. then allowing cooling in air. The condensers are washed out with acetone with a small brush and wiped to ensure that no fuel residues are present, then allowed to dry in air.

Test Procedure

1. Turn heating block on and allow to heat up to a constant temperature of 180° C.
2. Number test cells and place in corresponding sites,
3. Inlet tubes and condensers are set up as shown in FIG. 3.
4. Sites 1–5 are used for test fuel samples. Place 100 mls of test fuel in each cell by carefully releasing the condenser and inserting a glass funnel.
5. Repeat for site 6 using a control fuel.
6. Set the flows for each site to 1.3 lt/hour by adjusting the glass bead floats. (Refer to calibration chart for correct setting
7. Reflux the fuels for 5 hours at 180° C.
8. After the 5 hours remove the inlet tubes and condensers.
9. Remove the test cells and place in a suitable stand.
10. Allow to cool for 16 hours (overnight).
11. Place all used glassware in furnace for cleaning.
12. For each sample pre-weigh a 0.7–1 µm glass micro-fibre filter. Place the test cells in a ultrasonic bath for 3 minutes to release any deposit adhered to the sides of the cell, then filter the fuel under vacuum. Rinse the test cell rinsed with heptane or 2-2-4 trimethylpentane and also filter.
13. Place the filters on petri dishes and dry in a oven at 60° C. for 3 hours
14. Re-weigh the filter papers and perform the calculation below.

Calculation—The information is required in mg per liter.

$$\frac{(\text{weight of filter with deposits in g}) - (\text{weight of filter in g}) \times 1000}{0.1 \text{ litre}}$$

Protocol II—HLPS

Scope—HLPS is a self-contained testing apparatus designed to test the thermal properties of base and additised jet fuels. The test involves the flow of the test fuel over a heated test surface (at 335° C.) under high pressure (500 psi).

Summary The HLPS is run in accordance with ASTM D-3241. The conditions for testing are set to those used by the USAF in extensive thermal stability programmes.

The basic principles of the HLPS are shown in FIG. 2. As shown in FIG. 2, 1 liter of test fuel is pressurised in a stainless steel reservoir to 500 psi. The fuel is then pumped via a pre-filter over a heated test section (at 335° C.). As deposition occurs on both the tube and in the fuel bulk the bulk deposit is measured as a filter drop change across a 17 micron filter. A pressure transducer cell measures the rate of pressure drop (in mmHg min$^{-1}$). Finally the spent fuel is returned to the top of the reservoir, separated by an appropriate seal.

Apparatus

Alcor HLPS is a modular version of the equipment set up as defined in ASTM D-3241. The test section must be of stainless steel 316 and free from grease. The filter to be used must be of 17 micron mesh as supplied by Alcor.

Materials

Base fuels—fuels free of additives

Additised fuels—base fuels that have been treated with a specified additive or additive package.

Main Test Procedure

Sample Preparation:

1. Filter 1 liter of base test fuel through a 0.7 micron filter.
2. If fuel is to be additised transfer the known weight of additive(s) to a 1 liter volumetric flask using base test fuel.
3. Transfer the test fuel to a 2 liter beaker. Aerate using the glass bubbler attachment for a minimum of 6 minutes. Test run must be initiated within 1 hour of aeration.
4. Transfer the test fuel to the stainless steel reservoir.
5. Check the piston seal for degradation. If OK place the piston head on the surface of the fuel and push down using the supplied handle until fuel begins to seep up from the reservoir.
6. Place the large 'O' ring seal in the reservoir top and secure to the top of the reservoir using a socket wrench.
7. Connect the connector tube from the filter unit to the test cell using new 'O' ring.
8. Connect all remaining pipe-work using new 'O' rings.

Main Test Run Procedure:

1. Close BLEED valve on front of HLPS and open PRESSURISE valve. Ensure that system id pressurised to 500 psi.
2. Ensure that lower knob on delta P cell is turned to BYPASS and upper knob is VENT CLOSED.
3. Switch on PUMP. Red indicator light will come on. Ensure that FUEL FLOW CONTROL is set to 230. This equates to a flow rate of 3 mls/min.
4. Allow fuel to pump round system until a steady drop rate is seen through the perspex window on top of the fuel reservoir. When steady, count the time taken for 20 drops. If the time is 9 secs. +/− 1 second this is acceptable for 3 mls/min.
5. Ensure that HEATER TUBE TEMP. CONTROL is set to 335° C. Switch on HEATER. Red indicator light will come on. Needle will then rise to the vertical. Heater power is controlled by using the POWER CONTROL dial. A typical setting for this procedure is 82+/−10 volts.
6. Switch on the differential pressure module (DPM) by depressing the POWER button.

7. When needle reads correct temperature switch the delta P lower knob to RUN. This will divert the fuel flow through the differential pressure cell.
8. Allow the pressure read out on the differential pressure module to equilibrate and press RECORD. The differential pressure will be recorded every 5 minutes on the in-built printer.
9. Allow the test to run whilst monitoring the differential pressure change. The DPM has an alarm setting that will cause multi-point printing at 125 mmHg. If the differential pressure rises above 300 mmHg turn the lower DPM knob to bypass and note the time.
10. In all cases allow the test run to complete a 5 hour test sequence. The HLPS will shut down automatically after 5 hours.

Analysis—Analysis is carried out on the Leco Carbon Analyser RC412.

Results

The results are quoted for 2 readings.

Filter blockage—Record the change in differential pressure during the run. Results are quoted in mmHg min$^{-1}$, e.g. 300/45, 0/300. The first figure is the change in differential pressure in mmHg the latter the time in minutes Carbon deposit weight—Record the value in $\mu gcm^{-2}$ Syntheses Polymeric Compound 1 (PC1)

Polymeric compounds according to the present invention were synthesised from the following reactants:

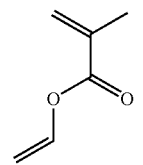

Allyl Methacrylate

Monomer A

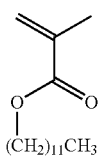

Lauryl Methacrylate

Monomer B

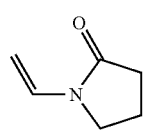

N-vinylpyrrolidone

Compound C

Method—PC1 Sample 1

Lauryl methacrylate (88.76 g), allyl methacrylate (1.7 g), dodecanethiol (0.52 g) and Finasol K2571 solvent (51 g) were placed into a reaction flask equipped with an overhead stirrer, condenser, thermometer and nitrogen bleed. Nitrogen was passed over the mixture with stirring for 55 minutes while the reactor contents were heated to 80–85° C. AIBN initiator (0.1 g) was added and the reaction mix was kept at this temperature for 2 hours. The temperature was increased to 90° C. and NVP (10.1 g) and benzoyl peroxide (0.34 g) were added. After 55 minutes a further amount of benzoyl peroxide (0.48 g) was added and the reaction was held at temperature for an hour before heating to 120° C. for a further hour. On cooling aromatic 150 solvent (50 g) was added. Unreacted monomer and solvent were stripped from the sample before analysis and testing.

Method—PC Samples 2, 3 and 4

PC1 samples 2, 3 and 4 were produced following the same general method as PC1 sample 1 but with the following differences in weights and times.

|  | PC1 Sample 2 | PC1 Sample 3 | PC1 Sample 4 |
| --- | --- | --- | --- |
| Lauryl methacrylate/g | 88.97 | 88.93 | 77.4 |
| Allyl methacrylate/g | 1.69 | 1.74 | 1.54 |
| Dodecanethiol/g | 0.50 | 0.53 | 0.47 |
| Solvent/g | 49.97 | 52.46 | 48.76 |
| Time at 80–85° C./min | 125 | 130 | 117 |
| NVP/g | 10.41 | 10.41 | 9.11 |
| Time at 90° C./min | 120 | 130 | 147 |

Method—PC1 Sample 5

Lauryl methacrylate (88.65 g), allyl methacrylate (1.75 g), dodecanethiol (0.5 g) and Finasol K2571 solvent (52.07 g) were placed into a reaction flask equipped with an overhead stirrer, condenser, thermometer and nitrogen bleed. Nitrogen was passed over the mixture with stirring for 60 minutes while the reactor contents were heated to 80–85° C. AIBN initiator (0.1 g) was added and the reaction mix was kept at this temperature for 2 hours. The temperature was increased to 90° C. and benzoyl peroxide (0.36 g) were added. After 60 minutes a further amount of benzoyl peroxide (0.519) was added and the reaction was held at temperature for an hour before heating to 120° C. for a further hour before cooling. A sample of the product (71.27 g) was reheated to 90° C. in the reactor before adding NVP (5.64 g) and benzoyl peroxide (0.19 g). After 90 minutes a further addition of benzoyl peroxide (0.27 g) was made and the reaction held at temperature for one hour before heating to 120° C. for an hour and 20 minutes. At this stage aromatic 150 solvent (66.71 g) was added. Unreacted monomer and solvent were stripped from the sample before analysis and testing.

Method—PC1 Sample 6

Lauryl methacrylate (88.86 g), allyl methacrylate (1.75 g), dodecanethiol (0.5 g) and Finasol K2571 solvent (52.78 g) were placed into a reaction flask equipped with an overhead stirrer, condenser, thermometer and nitrogen bleed. Nitrogen was passed over the mixture with stirring for 45 minutes while the reactor contents were heated to 80–85° C. AIBN initiator (0.1 g) was added and the reaction mix was kept at this temperature for 5 hours and 15 minutes. The temperature was increased to 90° C. and NVP (10.83 g) and benzoyl peroxide (0.359) were added. After 60 minutes a further amount of benzoyl peroxide (0.5 g) was added and the reaction was held at temperature for an hour before heating to 120° C. for a further 65 minutes. On cooling aromatic 150 solvent (60.419) was added. Unreacted monomer and solvent were stripped from the sample before analysis and testing.

Method—PC1 Sample 7

Lauryl methacrylate (87.14 g), allyl methacrylate (1.75 g), dodecanethiol (0.5 g) and Finasol K2571 solvent (56.469)

were placed into a reaction flask equipped with an overhead stirrer, condenser, thermometer and nitrogen bleed. Nitrogen was passed over the mixture with stirring for 55 minutes while the reactor contents were heated to 80–85° C. AIBN initiator (0.1 g) was added and the reaction mix was kept at this temperature for 2 hours A second addition of AIBN (0.1 g) was made and heating continued for 4 hours. The temperature was increased to 90° C. and NVP (10.79 g) and benzoyl peroxide (0.35 g) were added. After one hour and 15 minutes a further amount of benzoyl peroxide (0.5 g) was added and the reaction was held at temperature for an hour and 10 minutes before heating to 120° C. for a further hour. On cooling aromatic 150 solvent (72.78 g) was added. Unreacted monomer and solvent were stripped from the sample before analysis and testing.

Polymeric Compound 2 (PC2)

Polymeric compounds according to the present invention were synthesised from the following reactants:

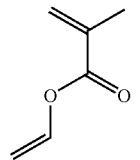

Monomer A

Allyl Methacrylate

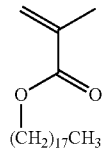

Monomer B

Stearyl Methacrylate

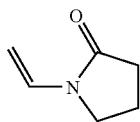

Compound C

N-vinylpyrrolidone

Method—PC2 Sample 1

Stearyl methacrylate (111.549), allyl methacrylate (1.75 g), dodecanethiol (0.5 g) and Finasol K2571 solvent (71.18 g) were placed into a reaction flask equipped with an overhead stirrer, condenser, thermometer and nitrogen bleed (owing to equipment problems the mixture of reactants was then stored in a fridge at ~2° C. for one week before commencing the reaction). Nitrogen was passed over the mixture with stirring for 55 minutes while the reactor contents were heated to 80–85° C. AIBN initiator (0.1 g) was added and the reaction mix was kept at this temperature for 1 hour and 10 minutes at which point extra solvent (172.87 g) was added and the temperature brought back to 80° C. The temperature was increased to 90° C. and NVP (10.75 g) and benzoyl peroxide (0.35 g) were added. After 1 hour a further amount of benzoyl peroxide (0.5 g) was added and the reaction was held at temperature for an hour before heating to 120° C. for a further hour before addition of aromatic 150 solvent (101.06 g) and subsequent cooling. Unreacted monomer and solvent were stripped from the sample before analysis and testing.

Method—PC2 Sample 2

PC2 sample 2 was produced following the same general method as PC2 sample 3 below but with the following differences in weights and times.

|  | PC2 Sample 2 |
|---|---|
| Stearyl methacrylate/g | 112.9 |
| Allyl methacrylate/g | 1.8 |
| Dodecanethiol/g | 0.5 |
| Solvent/g | 99.75 |
| Time at 80–85° C./min | 120 |
| NVP/g | 10.0 |
| Time at 90° C./min | 150 |

Method—PC2 Sample 3

Stearyl methacrylate (112 g), allyl methacrylate (1.75 g), dodecanethiol (0.5 g) and Finasol K2571 solvent (98.7 g) were placed into a reaction flask equipped with an overhead stirrer, condenser, thermometer and nitrogen bleed. Nitrogen was passed over the mixture with stirring for 55 minutes while the reactor contents were heated to 80–85° C. AIBN initiator (0.09 g) was added and the reaction mix was kept at this temperature for 2 hours. The temperature was increased to 90° C. and NVP (10.189) and benzoyl peroxide (0.35 g) were added. After 1 hour a further amount of benzoyl peroxide (0.5 g) was added and the reaction was held at temperature for an hour before heating to 120° C. for a further hour before cooling. Unreacted monomer and solvent were stripped from the sample before analysis and testing.

ICOT Results

PC1

Two different concentrations of samples of PC1 were added to a fuel (Shell Hydrotreated) and the resulting test samples were tested using the ICOT. The following data were generated.

| | Test Sample | | |
|---|---|---|---|
| Fuel | PC1 Sample | [PC1] | Deposit mass mg/L |
| Shell Hydrotreated | — | — | 126 |
| Shell Hydrotreated | 1 | 25 mg/l | |
| Shell Hydrotreated | 2 | 25 mg/l | 57 |
| Shell Hydrotreated | 3 | 25 mg/l | 22 |
| Shell Hydrotreated | 4 | 25 mg/l | 120 |
| Shell Hydrotreated | 1 | 100 mg/l | 16.5 |
| Shell Hydrotreated | 2 | 100 mg/l | 19 |
| Shell Hydrotreated | 3 | 100 mg/l | 21.5 |
| Shell Hydrotreated | 4 | 100 mg/l | 19.5 |

Two additive packages each comprising a sample of PC1, an antioxidant (2,6-di-t-butyl-4-methyl phenol (BHT)) and a metal deactivating agent (MDA) (N,N'-disalicylidene-1,2-propanediamine) in the following amounts, were added to a fuel (Shell Hydrotreated).

Test Sample

| Fuel | Additive Package No. | PC1 Sample | Deposit mass mg/L |
|---|---|---|---|
| Shell Hydrotreated | — | — | 126 |
| Shell Hydrotreated | 1 | 1 | 22 |
| Shell Hydrotreated | 1 | 2 | 47 |
| Shell Hydrotreated | 1 | 3 | 32 |
| Shell Hydrotreated | 1 | 4 | 50.5 |
| Shell Hydrotreated | 1 | 5 | 19 |
| Shell Hydrotreated | 1 | 6 | 22 |
| Shell Hydrotreated | 1 | 7 | 41 |
| Shell Hydrotreated | 2 | 1 | 16.5 |
| Shell Hydrotreated | 2 | 2 | 24.5 |
| Shell Hydrotreated | 2 | 3 | 26 |
| Shell Hydrotreated | 2 | 4 | 14.5 |
| Shell Hydrotreated | 2 | 5 | 16 |
| Shell Hydrotreated | 2 | 6 | 12.5 |
| Shell Hydrotreated | 2 | 7 | 15.5 |

Additive Package 1:
PC1  25 mg/L
BHT  25 mg/L (active ingredient)
MDA  2 mg/L (active ingredient)
Additive Package 2:
PC1  100 mg/L
BHT  25 mg/L (active ingredient)
MDA  2 mg/L (active ingredient)

PC2

Two additive packages each comprising a sample of PC2, an antioxidant (2,6-di-t-butyl-4-methyl phenol (BHI)) and a metal deactivating agent (MDA) (N,N'-disalicylidene-1,2-propanediamine) in the following amounts were added to Shell Hydrotreated fuel.

Test Sample

| Fuel | Additive Package No. | PC2 Sample | Deposit mass mg/L |
|---|---|---|---|
| Shell Hydrotreated | — | — | 126 |
| Shell Hydrotreated | 3 | 1 | 7.5 |
| Shell Hydrotreated | 3 | 2 | 24 |
| Shell Hydrotreated | 3 | 3 | 15.5 |
| Shell Hydrotreated | 4 | 1 | 8 |
| Shell Hydrotreated | 4 | 2 | 18.5 |
| Shell Hydrotreated | 4 | 3 | 15 |

Additive Package 3:
PC2  25 mg/L
BHT  25 mg/L (active ingredient)
MDA  2 mg/L (active ingredient)
Additive Package 4:
PC2  100 mg/L
BHT  25 mg/L (active ingredient)
MDA  2 mg/L (active ingredient)

HLPS Results

Four different basefuels were tested using the HPLS test and the results were recorded. The same fuels were then treated with additive package 5 and re-tested using the HPLS test. The results are shown below.

| Fuel | Basefuel Surface carbon µg/cm2 | Basefuel ΔP | Additised Fuel Surface carbon µg/cm2 | Additised Fuel ΔP |
|---|---|---|---|---|
| Shell HT | 39 | 300/230 | 20 | 0/300 |
| Shell Merox | 157 | 300/170 | 34 | 0/300 |
| POSF3684 | 125 | 300/45 | 22 | 4/300 |
| POSF3219 | 95 | 300/148 | 22 | 1/300 |

Additive Package 5:
PC2 Sample 3       25 mg/L (active ingredient)
Dilauryl phosphonate  10 mg/L (active ingredient)
MDA                2 mg/L (active ingredient)

All publications mentioned in the above specification are herein incorporated by is reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims

The invention claimed is:

1. A fuel composition comprising
   (i) a fuel; and
   (ii) a polymeric compound;
   wherein the polymeric compound comprises at least one monomer unit of Formula I

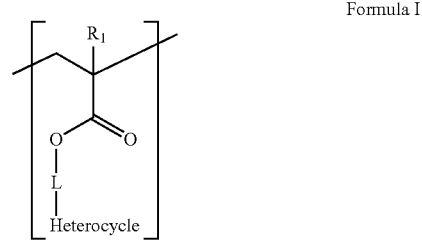

Formula I wherein $R_1$ is H or a $C_{1-10}$ hydrocarbyl group;
wherein L is an optional $C_{1-13}$ hydrocarbyl linker group; and
wherein heterocycle is an optionally substituted heterocyclic ring, wherein the heterocyclic ring is of Formula IV

Formula IV which contains no heteroatoms other than nitrogen and oxygen shown.

2. A fuel composition according to claim 1 wherein the polymeric compound further comprises at least one monomer unit of Formula II

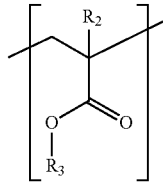

Formula II wherein $R_2$ is H or a $C_{1-10}$ hydrocarbyl group; and
wherein $R_3$ is a $C_{1-30}$ hydrocarbyl group.

3. A fuel composition according to claim 2 wherein $R_2$ is H or a $C_{1-5}$ hydrocarbyl group.

4. A fuel composition according to claim 2 wherein $R_2$ is H or a hydrocarbon group.

5. A fuel composition according to claim 2 wherein $R_2$ is H or an alkyl group.

6. A fuel composition according to claims 2 wherein $R_2$ is H or methyl.

7. A fuel composition according to claim 2 wherein $R_3$ is a $C_{1-25}$ hydrocarbyl group.

8. A fuel composition according to claim 2 wherein $R_3$ is a $C_{5-25}$ hydrocarbyl group.

9. A fuel composition according to claim 2 wherein $R_3$ is a hydrocarbon group.

10. A fuel composition according to claim 2 wherein monomer units of Formula I and/or monomer units of Formula II comprise at least 70% by weight of the polymeric compound.

11. A fuel composition according to claim 1 wherein the polymeric compound further comprises at least one monomer unit of Formula III

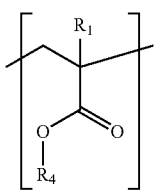

Formula III wherein $R_1$ is H or a $C_{1-10}$ hydrocarbyl group; and
wherein $R_4$ is a $C_{2-10}$ unsaturated hydrocarbyl group.

12. A fuel composition according to claim 11 wherein $R_4$ is a $C_{2-5}$ unsaturated hydrocarbyl group.

13. A fuel composition according to claim 11 wherein $R_4$ is an unsaturated hydrocarbon group.

14. A fuel composition according to claim 11 wherein $R_4$ comprises a terminal carbon-carbon multiple bond.

15. A fuel composition according to claim 11 wherein $R_4$ is an ethenyl group.

16. A fuel composition according to claim 11 wherein monomer units of Formula I and/or monomer units of Formula III comprise at least 70% by weight of the polymeric compound.

17. A fuel composition according to claim 1 wherein the heterocyclic ring is a 4 to 10 membered ring.

18. A fuel composition according to claim 1 wherein the heterocyclic ring is a 4, 5 or 6 membered ring.

19. A fuel composition according to claim 1 wherein the heterocyclic ring is of Formula V

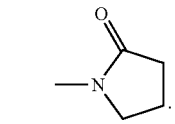

Formula V

20. A fuel composition according to claim 1 wherein L is a $C_{1-20}$ hydrocarbyl linker group.

21. A fuel composition according to claim 1 wherein L is a $C_{1-10}$ hydrocarbyl linker group.

22. A fuel composition according to claim 1 wherein L is a $C_{4-10}$ hydrocarbyl linker group.

23. A fuel composition according to claim 1 wherein L is a hydrocarbon linker group.

24. A fuel composition according to claim 1 wherein L is a straight chained or branched hydrocarbon linker group having the formula $(C_xH_{2x})$-wherein x is an integer.

25. A fuel composition according to claim 1 wherein L is $(CH_2)_4$.

26. A fuel composition according to claim 1 wherein $R_1$ is H or a $C_{1-5}$ hydrocarbyl group.

27. A fuel composition according to claim 1 wherein $R_1$ is H or a hydrocarbon group.

28. A fuel composition according to claim 1 wherein $R_1$ is H or an alkyl group.

29. A fuel composition according to claim 1 wherein $R_1$ is H or methyl.

30. A fuel composition according to claim 1 wherein monomer units of Formula I comprise at least 70% by weight of the polymeric compound.

31. A fuel composition according to claim 1 wherein the molecular weight ($M_n$) of the polymeric compound is from 20,000 to 90,000.

32. A fuel composition according to claim 1 wherein the fuel is a jet fuel.

33. A fuel composition according to claim 1 wherein the polymeric compound is present in an amount of 15 to 30 mg/L.

34. A method for inhibiting deposit formation in a fuel at a temperature of from 100 to 335° C., the method comprising combining with the fuel a polymeric compound comprising at least one monomer unit of Formula I

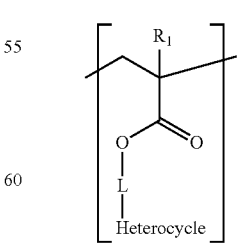

Formula I wherein $R_1$ is H or a $C_{1-10}$ hydrocarbyl group;
wherein L is an optional $C_{1-30}$ hydrocarbyl linker group; and wherein heterocycle is an optionally substituted heterocyclic ring, wherein the heterocyclic ring is of Formula IV

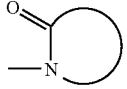

Formula IV which contains no heteroatoms other than nitrogen and oxygen shown.

35. A method making a fuel composition comprising;
(i) polymerizing monomer A

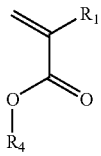

Monomer A wherein $R_1$ is H or a $C_{1-10}$ hydrocarbyl group and $R_4$ is a $C_{2-10}$ unsaturated hydrocarbyl group; and
(ii) reacting the product of step (i) with compound C $R_5$—Heterocycle Compound C wherein $R_5$ is a $C_{2-10}$ unsaturated hydrocarbyl group; and wherein heterocycle is an optionally substituted heterocyclic ring, wherein the heterocyclic ring is of Formula IV

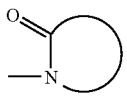

Formula IV which contains no heteroatoms other than nitrogen and oxygen shown to thereby form a polymeric compound comprising a unit of Formula I

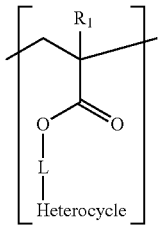

Formula I wherein L is an optional $C_{1-30}$ hydrocarbyl linker group; and
(ii) combining the polymeric compound with a fuel.

36. The method according to claim 35 wherein, in step (i), monomer A is copolymerized with monomer B

Monomer B wherein $R_2$ is H or a $C_{1-10}$ hydrocarbyl group; and wherein $R_3$ is a $C_{1-30}$ hydrocarbyl group.

37. The method according to claim 35 wherein $R_5$ is a $C_{2-5}$ unsaturated hydrocarbyl group.

38. The method according to claim 35 wherein $R_5$ is an unsaturated hydrocarbon group.

39. The method according to 35 wherein $R_5$ comprises a terminal carbon-carbon multiple bond.

40. The method according to 35 wherein $R_5$ is an ethenyl group.

41. The method according to claim 35 wherein the heterocyclic ring of compound C is a 4 to 10 membered ring.

42. The method according to claim 35 wherein the heterocyclic ring of compound C is a 4, 5 or 6 membered ring.

43. The method according to claim 35 wherein compound C is N-vinylpyrrolidone.

44. A fuel additive composition comprising
(i) a polymeric compound;
wherein the polymeric compound comprises at least one monomer unit of Formula I

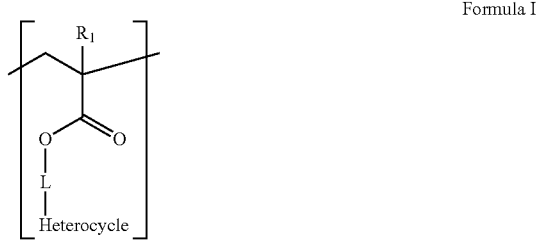

Formula I wherein $R_1$ is H or a $C_{1-10}$ hydrocarbyl group;
wherein L is an optional $C_{1-30}$ hydrocarbyl linker group; and
wherein heterocycle is an optionally substituted heterocyclic ring, wherein the heterocyclic ring is of Formula IV

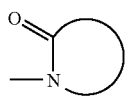

Formula IV which contains no heteroatoms other than nitrogen and oxygen shown, and
(ii) at least one from the group of a metal deactivator, an antioxidant, and combinations thereof.

45. A fuel additive composition according to claim 44 comprising the metal deactivator and the antioxidant.

46. A fuel composition comprising
(i) a fuel; and
(ii) the fuel additive composition as defined in claim 44.

* * * * *